United States Patent [19]

Robins et al.

[11] 4,115,295

[45] Sep. 19, 1978

[54] POLYMERIZABLE COMPOSITIONS CONTAINING HIGHLY FLUORINATED ALIPHATIC SULFONYL PROTONIC ACID CATALYST

[75] Inventors: Janis Robins, St. Paul; James E. Kropp, Maplewood; Chung I. Young, St. Paul, all of Minn.

[73] Assignee: Minnesota Mining and Manufacturing Company, Saint Paul, Minn.

[21] Appl. No.: 679,940

[22] Filed: Apr. 26, 1976

[51] Int. Cl.$^2$ .............................................. C08G 59/68
[52] U.S. Cl. .................................... 528/90; 528/110; 528/273; 528/408; 260/830 R; 260/830 TW; 528/404; 528/417; 528/418; 528/419; 528/421; 528/23; 528/26; 528/27; 528/231; 528/393; 528/361; 528/55
[58] Field of Search ............ 260/2 EC, 2 EP, 47 EC, 260/47 EP, 78.3 R, 59 EP, 830 R, 830 TW

[56] References Cited

U.S. PATENT DOCUMENTS

| | | | |
|---|---|---|---|
| 2,897,163 | 7/1959 | Clark et al. | 260/2 |
| 2,914,490 | 11/1959 | Wheelock | 260/2 |
| 2,990,396 | 6/1961 | Clark et al. | 260/47 |
| 3,080,341 | 3/1963 | Chenicek et al. | 260/47 |
| 3,242,104 | 3/1966 | Brueschweiler et al. | 260/2 |
| 3,244,754 | 4/1966 | Bruson et al. | 260/615 |
| 3,281,491 | 10/1966 | Smith et al. | 260/830 |
| 3,379,791 | 4/1968 | Larson et al. | 260/830 |
| 3,424,817 | 1/1969 | Hicks | 260/834 |
| 3,586,616 | 6/1971 | Kropp | 204/159.11 |
| 3,632,843 | 1/1972 | Allen et al. | 260/2 EC |

*Primary Examiner*—Harold D. Anderson
*Assistant Examiner*—E. A. Nielsen
*Attorney, Agent, or Firm*—Cruzan Alexander; Donald M. Sell; Dean P. Edmundson

[57] ABSTRACT

Two-part polymerizable compositions are described which contain (a) organic material having epoxide functionality, (b) organic material having hydroxyl functionality, and (c) a catalyst comprising highly fluorinated aliphatic sulfonyl protonic acid or a compound capable of liberating such acid. The compositions polymerize essentially completely at room temperature (or at slightly elevated temperatures). The polymerized compositions have desirable dielectric properties and are therefore especially useful for potting electrical components.

24 Claims, No Drawings

POLYMERIZABLE COMPOSITIONS CONTAINING HIGHLY FLUORINATED ALIPHATIC SULFONYL PROTONIC ACID CATALYST

BACKGROUND OF THE INVENTION

This invention relates to polymerizable compositions and, more particularly, to compositions containing organic material having epoxide functionality and organic material having hydroxyl functionality.

Compositions based on the reaction of an organic material having epoxide functionality with an organic material containing hydroxyl functionality have previously been disclosed. For example, U.S. Pat. Nos. 2,914,490, 2,990,396, 3,242,104, 3,244,754, 3,281,491, 3,379,791 and 3,424,817 disclose such compositions containing one of a variety of acid catalysts or basic catalysts. These compositions are polymerized to thermoset resins by heating them at 50° C. to 250° C. from 1 to several hundred hours and accordingly they do not polymerize to a tack-free state in less than 30 minutes. Because of the need for use of thermal energy, and extended reaction times, in order to cure these compositions, they are not suitable or convenient for many applications.

U.S. Pat. Nos. 3,080,341, and 3,281,491 disclose compositions based on the reaction of an organic material having epoxide functionality with an organic material having hydroxyl functionality in the presence of a Lewis acid. Although such compositions polymerize to a tack-free state in less than about 15 minutes, the polymerization is inhibited by the presence of moisture. Consequently, erratic results can be obtained when curing the compositions under various conditions of humidity.

Furthermore, the rate of polymerization of epoxide-containing material with hydroxyl-containing material varies drastically with small changes in concentration of Lewis acid catalysts. Consequently, the rate of polymerization of such compositions can be difficult to control when using such catalysts. Also, Lewis acid catalysts may decompose with aging at elevated temperatures resulting in compositions whose cure times change significantly with time. This has been particularly noted with Lewis acid catalysts of the phosphorus family, e.g. $PF_5$.

U.S. Pat. No. 2,897,163 discloses the polymerization of butadiene dioxide and a polyoxyalkylene polyol, in the presence of an alkali metal alcoholate, to polyhydric oxyhydrocarbon products. Such compositions require 2 to 20 hours at 90° C. to 100° C. to assure complete reaction and are therefore not rapidly polymerizable compositions.

SUMMARY OF THE INVENTION

In accordance with the present invention there is provided a two-part polymerizable composition comprising:

(a) a first organic material having epoxide functionality greater than 1;

(b) a second organic material having hydroxyl functionality of at least 1; and (c) a catalyst comprising highly fluorinated aliphatic sulfonyl protonic acid or a compound capable of liberating such acid, said catalyst being present in an amount of at least about 0.01% by weight of said first organic material.

These compositions polymerize rapidly at room temperature (or at slightly elevated temperatures). Also, the cured product exhibits very desirable dielectric properties. Accordingly, these compositions are very useful as, for example, potting compounds, adhesives, coatings, binders, etc.

Because the compositions cure at or near room temperature they may be used in applications where elevated temperatures must be avoided. Also, since the compositions polymerize to essential completion rapidly their use results in a considerable saving of time.

Furthermore, polymerization of the compositions is not significantly inhibited in the presence of moisture. Moreover, the rate of polymerization of the compositions is not as sensitive to change in catalyst concentration as is the case with prior compositions.

DETAILED DESCRIPTION OF THE INVENTION

Epoxy-containing materials useful in the compositions of the invention are any organic compounds having an oxirane ring

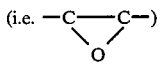

polymerizable by ring opening. Such materials, broadly called epoxides, include monomeric epoxy compounds and epoxides of the polymeric type and can be aliphatic, cycloaliphatic, aromatic or heterocyclic. These materials generally have, on the average, at least one polymerizable epoxy group per molecule (preferably two or more epoxy groups per molecule). The polymeric epoxides include linear polymers having terminal epoxy groups (e.g., a diglycidyl ether of a polyoxyalkylene glycol), polymers having skeletal oxirane units (e.g. polybutadiene polyepoxide), and polymers having pendent epoxy groups (e.g., a glycidyl methacrylate polymer or copolymer). The epoxides may be pure compounds but are generally mixtures containing one, two or more epoxy groups per molecule. The "average" number of epoxy groups per molecule is determined by dividing the total number of epoxy groups in the epoxy-containing material by the total number of epoxy molecules present. It is preferred that no more than about 25% of the epoxy equivalents in the compositions are in the form of a compound containing only one epoxy group.

These epoxy-containing materials may vary from low molecular weight monomeric materials to high molecular weight polymers and may vary greatly in the nature of their backbone and substituent groups. For example, the backbone may be of any type and substituent groups thereon can be any group free of an active hydrogen atom which is reactive with an oxirane ring at room temperature. Illustrative of permissible substituent groups include halogens, ester groups, ethers, sulfonate groups, siloxane groups, nitro groups, amide groups, nitrile groups, phosphate groups, etc. The molecular weight of the epoxy-containing materials may vary from 58 to about 100,000 or more. Mixtures of various epoxy-containing materials can also be used in the compositions of this invention.

Useful epoxy-containing materials include those which contain cyclohexene oxide groups such as the epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexane carboxylate, and bis(3,4-epoxy-6-methylcyclohexylmethyl) adipate. For a more detailed list of useful epoxides of this nature, reference is made to the U.S. Pat. No. 3,117,099, incorporated herein by reference.

Further epoxy-containing materials which are particularly useful in the practice of this invention include glycidyl ether monomers of the formula

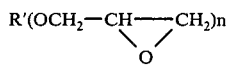

where R' is alkyl or aryl and $n$ is an integer of 1 to 6. Examples are the glycidyl ethers of polyhydric phenols obtained by reacting a polyhydric phenol with an excess of chlorohydrin such as epichlorohydrin (e.g., the diglycidyl ether of 2,2-bis-(2,3-epoxypropoxyphenol)-propane). Further examples of epoxides of this type which can be used in the practice of this invention are described in U.S. Pat. No. 3,018,262, incorporated herein by reference, and in "Handbook of Epoxy Resins" by Lee and Neville, McGraw-Hill Book Co., New York (1967).

There are a host of commercially available epoxycontaining materials which can be used in this invention. In particular, epoxides which are readily available include propylene oxide, octadecylene oxide, epichlorohydrin, styrene oxide, vinyl cyclohexene oxide, glycidol, glycidylmethacrylate, diglycidyl ether of Bisphenol A (e.g., those available under the trade designations "Epon 828," "Epon 1004" and "Epon 1010" from Shell Chemical Co., "DER-331," "DER-332," and "DER-334," from Dow Chemical Co.), vinylcyclohexene dioxide (e.g., "ERL-4206" from Union Carbide Corp.), 3,4-epoxycyclohexylmethyl-3,4-epoxycyclohexene carboxylate (e.g., "ERL-4221" from Union Carbide Corp.), 3,4-epoxy-6-methylcyclohexylmethyl-3,4-epoxy-6-methylcyclohexene carboxylate (e.g. "ERL-4201" from Union Carbide Corp.), bis(3,4-epoxy-6-methylcyclohexylmethyl) adipate (e.g. "ERL-4289" from Union Carbide Corp.), bis(2,3-epoxycyclopentyl) ether (e.g., "ERL-0400" from Union Carbide Corp.), aliphatic epoxy modified with polypropylene glycol (e.g., "ERL-4050" and "ERL-4052" from Union Carbide Corp.), dipentene dioxide (e.g. "ERL-4269" from Union Carbide Corp.), epoxidized polybutadiene (e.g. "Oxiron 2001" from FMC Corp.), silicone resin containing epoxy functionality (e.g. 2,4,6,8,10-pentakis [3-(2,3-epoxypropoxy)propyl]-2,4,6,8,10-pentamethylcyclopentasiloxane and the diglycidyl ether of 1,3-bis(3-hydroxypropyl)tetramethyldisiloxane), flame retardant epoxy resins (e.g. "DER-580," a brominated bisphenol type epoxy resin available from Dow Chemical Co.), 1,4-butanediol diglycidyl ether (e.g. "Araldite RD-2" from Ciga-Geigy), polyglycidyl ether of phenolformaldehyde novolak (e.g. "DEN-431" and "DEN-438" from Dow Chemical Co.), and resorcinol diglycidyl ether (e.g. "Kopoxite" from Koppers Company, Inc.).

Other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methylmethacrylate-glycidylacrylate and a 62.5:24:13.5 methylmethacrylate-ethyl acrylate-glycidylmethacrylate.

Still other epoxy-containing materials, albeit less preferable, are the polyurethane polyepoxides which are obtained by reacting an organic polyisocyanate with a triol or a mixture of a triol and diol to form an isocyanate-terminated polyurethane prepolymer and reacting the prepolymer with a hydroxy aliphatic epoxide compound. Further examples of epoxy-containing material of this type which can be used in the practice of this invention are described in U.S. Pat. No. 3,445,436, incorporated herein by reference.

The hydroxyl-containing material which is used in the present invention may be any liquid or solid organic material having hydroxyl functionality of at least 1, and preferably at least 2. Also, the hydroxyl-containing organic material is free of other "active hydrogens." The term "active hydrogen" is well known and commonly used in the art, and as used herein it means active hydrogen as determined by the method described by Zerewitinoff in *J. Am. Chem. Soc.*, Vol. 49, 3181 (1927), incorporated herein by reference. Of course, the hydroxyl-containing material is also substantially free of groups which may be thermally unstable.

Preferably the organic material contains two or more primary or secondary aliphatic hydroxyl groups (i.e. the hydroxyl group is bonded directly to a non-aromatic carbon atom). The hydroxyl groups may be terminally situated, or they may be pendent from a polymer or copolymer. The molecular weight (i.e. number average molecular weight) of the hydroxyl-containing organic material may vary from very low (e.g. 62) to very high (e.g. one million or more). The equivalent weight (i.e. number average equivalent weight) of the hydroxyl-containing material is preferably in the range of about 31 to 5000. When materials of higher equivalent weight are used they tend to reduce the rate and extent of copolymerization.

Representative examples of suitable organic materials having a hydroxyl functionality of 1 include alkanols, monoalkyl esters of polyoxyalkyleneglycols, monoalkyl ethers of alkyleneglycols, and others known to the art.

Representative examples of useful monomeric polyhydroxy organic materials include alkylene glycols (e.g. 1,2-ethanediol, 1,3-propanediol, 1,4-butanediol, 2-ethyl-1,6-hexanediol, bis(hydroxymethyl)cyclohexane, 1,18-dihydroxyoctadecane, 3-chloro-1,2-propanediol), polyhydroxyalkanes (e.g., glycerine, trimethylolethane, pentaerythritol, sorbitol) and other polyhydroxy compounds such as N,N-bis(hydroxyethyl)benzamide, 2-butyne-1,4-diol, 4,4'-bis(hydroxymethyl)diphenylsulfone, castor oil, etc.

Representative examples of useful polymeric hydroxycontaining materials include polyoxyethylene and polyoxypropylene glycols and triols of molecular weights from about 200 to about 10,000, corresponding to equivalent weights of 100 to 5000 for the diols or 70 to 3300 for triols; polytetramethylene glycols of varying molecular weight; copolymers of hydroxypropyl and hydroxyethyl acrylates and methacrylates with other free radical-polymerizable monomers such as acrylate esters, vinyl halides, or styrene; copolymers containing pendent hydroxy groups formed by hydrolysis or partial hydrolysis of vinyl acetate copolymers, polyvinylacetal resins containing pendent hydroxyl groups; modified cellulose polymers such as hydroxyethylated and hydroxypropylated cellulose; hydroxy-terminated polyesters and hydroxyterminated polylactones; and hydroxy-terminated polyalkadienes.

Useful commercially available hydroxyl-containing materials include the "Polymeg" ® series (available from Quaker Oats Company) of polytetramethylene ether glycols such as "Polymeg" 650, 1000 and 2000; "PeP" series (available from Wyandotte Chemicals Corporation) of polyoxyalkylene tetrols having secondary hydroxyl groups such as "PeP" 450, 550 and 650; "Butvar" series (available from Monsanto Chemical Company) of polyvinylacetal resins such as "Butvar" B-72A, B-73, B-76, B-90 and B-98; and "Formvar" 7/70, 12/85, 7/95S, 7/95E, 15/95S and 15/95E; "PCP" series (available from Union Carbide) of polycaprolactone polyols such as "PCP" 0200, 0210, 0230, 0240, 0300; "Paraplex U-148" (available from Rohm and Haas), an aliphatic polyester diol; "Multron" > series (available from Mobay Chemical Co.) of saturated polyester polyols such as "Multron" R-2, R-12A, R-16, R-18, R-38, R-68 and R-74; "Klucel E" (available from Hercules Inc.) a hydroxypropylated cellulose having an equivalent weight of approximately 100; and "Alcohol Soluble Butyrate" (available from Eastman Kodak) a cellulose acetate butyrate ester having a hydroxyl equivalent weight of approximately 400.

The amount of hydroxyl-containing organic material used in the compositions of the invention may vary over broad ranges, depending upon factors such as the compatibility of the hydroxyl-containing material with the epoxide, the equivalent weight and functionality of the hydroxyl-containing material, the physical properties desired in the final cured composition, etc.

Generally speaking, with increasing amounts of hydroxyl-containing material in the composition the cured product exhibits improved impact resistance, adhesion to substrates, flexibility, and decreased shrinkage during curing, and correspondingly there is a gradual decrease in hardness, tensile strength and solvent-resistance.

Although both mono-functional and poly-functional hydroxyl-containing materials provide desirable results in the compositions of the invention, use of the poly-functional hydroxyl-containing materials is highly preferred for a majority of applications, although the mono-functional hydroxyl-containing materials are particularly effective in providing low viscosity, solvent-free coating compositions. When using hydroxyl-containing organic materials having a functionality significantly less than 2 (e.g. 1 to 1.5), amounts greater than about 0.2 equivalent of hydroxyl per equivalent of epoxy tend to provide cured compositions which are generally low in internal strength and tensile strength and are susceptible to solvent attack, and consequently may be unsuitable for many applications. This tendency becomes increasingly more apparent with increasing equivalent weight of the hydroxyl-containing material. Accordingly, when using mono-functional hydroxy materials it is preferred that the equivalent weight thereof be no greater than about 250. When using mixtures of mono- and poly-functional hydroxyl-containing materials, up to about 25% of the total hydroxyl equivalents in the mixture may be in the form of the mono-functional hydroxyl-containing material.

In the polymerizable compositions of the invention the ratio of equivalents of hydroxyl-containing material to equivalents of epoxide may vary from about 0.001/1 to 3.1, preferably from about 0.3/1 to 1.5/1, depending upon the properties desired in the cured composition. For applications where one primarily desires flexibilization of an epoxy resin (e.g., for protective coatings on metal) ratios as low as 0.001/1 provide improved results. For applications where the epoxide is present primarily as an insolubilizing agent for a polyhydroxyl-containing film-forming thermoplastic organic material (e.g. coatings for printing plates), ratios of hydroxyl equivalents to epoxide equivalents may be as high as 3/1. Generally speaking, the higher the hydroxyl equivalent weight the more effective such material is in imparting a given degree of toughness and flexibility to the cured composition.

Mixtures of hydroxyl-containing materials may be used, when desired. For example, one may use mixtures of two or more poly-functional hydroxy materials, one or more mono-functional hydroxy materials with poly-functional hydroxy materials, etc.

Catalysts which are useful in the compositions of the invention for effecting substantially complete reaction between the first and second organic materials are bis(-highly fluorinated aliphatic sulfonyl) alkanes (preferably $C_1-C_5$) and compounds which liberate such catalysts in the presence of, e.g. heat or moisture. For example, bis(highly fluorinated alkyl sulfonyl)alkenes, upon hydrolysis, will yield bis-(highly fluorinated alkyl sulfonyl) alkanes.

The catalysts useful in this invention are generally called highly fluorinated aliphatic sulfonyl protonic acids. Preferably, the catalysts are bis(perfluoroalkylsulfonyl)methanes.

In the practice of this invention, the term highly fluorinated aliphatic radical encompasses fluorinated, saturated, monovalent, aliphatic radicals having 1 to 20 carbon atoms. The skeletal chain of the radical may be straight, branched or, if sufficiently large (e.g. at least 3 or 4 atoms) cycloaliphatic, and may be interrupted by divalent oxygen atoms or trivalent nitrogen atoms bonded only to carbon atoms. Preferably the chain of the fluorinated aliphatic radical does not contain more than one hetero atom, i.e. nitrogen or oxygen, for every two carbon atoms in the skeletal chain. A fully fluorinated group is preferred, but hydrogen or chlorine atoms may be present as substituents in the fluorinated aliphatic radical provided that not more than one atom of either is present in the radical for each carbon atom. Preferably, the fluoroaliphatic radical is a saturated perfluoroalkyl radical having a skeletal chain that is straight or branched and has the formula $C_xF_{2x+1}$ wherein $x$ has a value from 1 to 18.

The preferred catalysts of this invention are those compounds having the formula $$R_fSO_2-\underset{H}{\overset{R}{\underset{|}{\overset{|}{C}}}}-SO_2R'_f$$

where $R_f'$ and $R_f$ are independently a highly fluorinated or perfluorinated alkyl and R is selected from H, Br, Cl, I, alkyl having 1 to 20 or preferably 1 to 4 carbon atoms, alkenyl of 3 to 4 carbon atoms, aryl (e.g. phenyl, pyridyl naphthyl, thienyl, benzthienyl) or alkaryl (of up to 10 carbon atoms); the alkyl, aryl and alkaryl may, if desired, be substituted by one or more halogens, highly fluorinated alkylsulfonyl, carboxyl, alkoxycarbonyl, nitro, alkoxy, or acyloxy.

By fluorinated alkyl, it is meant herein a fluorinated, saturated monovalent, non-aromatic, aliphatic radical that is straight, branched, or cyclic. A fully fluorinated group is preferred, but hydrogen or chlorine atoms may be present as substituents in the fluorinated aliphatic radical provided that not more than one atom of either is present in the radical for every two atoms. The fluorinated aliphatic radical generally contains not more than 20 carbon atoms, preferably less than 8 carbon atoms, and more preferably contains up to 4 carbon atoms. Illustrative bis(perfluoroalkyl sulfonyl) protonic acids are:

Bis(trifluoromethylsulfonyl)methane
Tris(trifluoromethylsulfonyl)methane
Bis(trifluoromethylsulfonyl)-4-bromophenylmethane
Bis(trifluoromethylsulfonyl)-2-thienylmethane
Bis(trifluoromethylsulfonyl)chloromethane
Bis(trifluoromethylsulfonyl)benzylmethane
Bis(trifluoromethylsulfonyl)phenylmethane
Bis(trifluoromethylsulfonyl)-1-naphthylmethane
Bis(perfluorobutylsulfonyl)methane
Perfluorobutyltrifluoromethylmethane
Ethyl, 6, 6-Bis(perfluoromethylsulfonyl)-4-bromohexanoate
Methyl 4,4-Bis(perfluoromethylsulfonyl)-2-carbomethoxy-2-bromobutanoate
Ethyl 4,4-Bis(perfluoromethylsulfonyl)-2-carboethoxy-2-nitrobutanoate
1,1,3,3-Tetra(trifluoromethylsulfonyl)propane
1,1-Bis(trifluoromethylsulfonyl)octadecane Representative examples of suitable fluoroalkyl protonic acids useful as catalysts herein are described in U.S. Pat. Nos. 3,632,843, 3,704,311, 3,704,408, 3,776,960, 3,794,687, and assignee's copending application, Ser. No. 556,494, filed Mar. 7, 1975, incorporated herein by reference.

The compositions of the invention are typically provided as two-part compositions in which Part A contains organic material having epoxide functionality greater than 1 and Part B contains organic material having a hydroxyl functionality of at least 1 and also contains the desired catalyst.

Additionally, the compositions may contain conventional fillers to modify or impart desirable properties thereto. The fillers may be either organic or inorganic, e.g. finely divided silica, clays, flake mica, titanium dioxide, gypsum, refractories, colloidal carbon, glass fibers, and powders, flakes and fibers of organic polymers such as nylon and phenolformaldehyde resin. The compositions may also contain dyes, pigments, plasticizers, and the like.

The invention is further illustrated by means of the following non-limiting examples wherein the term "parts" refers to parts by weight unless otherwise indicated.

EXAMPLES 1–6

Several two-part curable compositions were prepared using various catalysts. In each example, Part A of the composition comprised 80 parts by weight diglycidyl ether of Bisphenol A ("Epon 828," commercially available from Shell Development Co.), and Part B comprised 20 parts by weight diethyleneglycol. The catalyst to be tested was also present in Part B, and the amount of catalyst used was sufficient to bring about gelling of the mixture of Part A and Part B in about 15 minutes.

Table I below shows, for each example, the catalyst tested, the amount of catalyst present, and the surface condition (i.e. tack-free or tacky) of the product attained by reaction of Part A and Part B after 0.5 hour in an atmosphere having a relatively humidity of about 40% (further curing by heating the products at 60° C. for 0.5 hour did not change the surface conditions listed).

TABLE I

| Ex. No. | Catalyst | (Parts) | Surface Condition |
|---|---|---|---|
| 1 | (CF$_3$SO$_2$)$_2$CH$_2$ | (0.12) | Tack-free |
| 2 | (CF$_3$SO$_2$)$_2$CH(C$_6$H$_5$) | (0.19) | " |
| 3 | DSMe* | (0.06) | " |
| 4 | DSBrMe** | (0.08) | " |
| 5 | BF$_3$ | (0.05) | Tacky |
| 6 | PF$_5$ | (0.15) | " |

*methyl 4,4-bis(trifluoromethylsulfonyl)-2-carbomethoxybutanoate
**methyl 4,4-bis(trifluoromethylsulfonyl)-2-carbomethoxy-2-bromobutanoate These examples show that highly fluorinated aliphatic sulfonyl protonic acid catalysts are effective in curing the compositions to a tack-free state even in atmospheres having a considerable relative humidity, whereas compositions containing conventional Lewis Acid catalysts remain tacky under the same conditions.

EXAMPLES 7–11

To illustrate the curing characteristics of various compositions in the presence of water, in addition to atmospheric humidity, several two-part compositions were prepared. Part A of each composition was as described in Examples 1–6; Part B comprised 20 parts by weight of diethyleneglycol and, for each example, sufficient catalyst to bring about gelling of the mixture of Part A and Part B in 1–2 minutes. Additionally, water (1% based on total weight of Part A and Part B) was added during the mixing of Part A and Part B.

Table II below shows, for each example, the catalyst tested, the amount of catalyst present, the gel time in the presence of 1% water, and the surface condition (i.e. tack-free or tacky) of the product attained by reaction of Part A and Part B after 0.5 hour in an atmosphere having a relative humidity of about 40%.

TABLE II

| Ex. No. | Catalyst | (Parts) | Gel Time (Minutes) 0% Water | Gel Time (Minutes) 1% Water | Surface Condition |
|---|---|---|---|---|---|
| 7 | BF$_3$ | (0.02) | 1–2 | 20 | Tacky |
| 8 | (CF$_3$SO$_2$)CH$_2$ | (1.2) | " | 6 | Tack-free |
| 9 | (CF$_3$SO$_2$)CH(C$_6$H$_5$) | (1.2) | " | 8 | " |
| 10 | DSMe* | (1.0) | " | 13 | " |
| 11 | DSBrMe** | (0.6) | " | 14 | " |

*methyl 4,4-bis(trifluoromethylsulfonyl)-2-carbomethoxybutanoate
**methyl 4,4-bis(trifluoromethylsulfonyl)-2-carbomethoxy-2-bromobutantanoate These examples show that the curing of compositions containing highly fluorinated aliphatic sulfonyl protonic acid catalysts is not appreciably retarded by the presence of 1% water, whereas the curing of compositions containing BF$_3$ is significantly retarded under the same conditions. The examples further show that tack-free surfaces are obtained even when curing the foregoing compositions of this invention in the presence of 1% water.

EXAMPLE 12

To show the effect of increasing amounts of hydroxyl-containing material in the compositions of the invention, two series of experiments were run in which the amount of hydroxyl-containing material was incrementally increased from 0 to 30% by weight of total composition. In one series bis(trifluoromethylsulfonyl)methane was used as catalyst and in the other boron trifluoride was the catalyst. Part A comprised "Epon 828;" Part B comprised diethyleneglycol (DEG). The results are shown in Table III.

TABLE III

| Composition: "Epon 828"/DEG | 100/0 | 95/5 | 90/10 | 85/15 | 80/20 | 75/25 | 70/30 |
|---|---|---|---|---|---|---|---|
| Catalyst-0.6 part $(CF_3SO_2)_2CH_2$ | | | | | | | |
| Gel Time (sec.) | ∞ | 190 | 120 | 120 | 90 | 100 | 110 |
| Surface After 60 mins. | | NT[1] | NT | NT | NT | NT | NT |
| Catalyst-0.2 part $BF_3$ | | | | | | | |
| Gel Time (sec.) | 15 | 45 | 60 | 70 | 90 | 120 | 130 |
| Surface After 60 mins. | T[2] | T | T | T | T | T | T |

[1] NT signifies non-tacky surface after 60 minutes at relative humidity of about 40%.
[2] T signifies tacky surface after 60 minutes at relative humidity of about 40%.

In Table III, it may be seen that when using a highly fluorinated aliphatic sulfonyl protonic acid catalyst, as the concentration of diethylene glycol (DEG) is increased, the gel time drops remarkably from infinity (i.e. no curing) to 190 seconds with only 5% DEG and continues to drop with concentrations of DEG up to 20%. Above 20% DEG, the gel time rises slowly. On the other hand, when using $BF_3$ as the catalyst, the gel time of the composition increases linearly with increased DEG concentration.

EXAMPLES 13-26

To illustrate the effect of catalyst concentration on the rate of curing of compositions containing both (a) material having epoxide functionality, and (b) material having hydroxyl functionality, there were run a series of examples, each having a Part A and a Part B. Part A in each example comprised 50 grams of a mixture of 80 parts "Epon 828" and 20 parts "ERL 4206" (vinyl cyclohexene dioxide commercially available from Union Carbide Corp.). Part B in each example comprised 50 grams of a mixture of 50 parts "NIAX" HEXOL LS-490 (a hexahydroxyl alkyleneoxide derivative commercially available from Union Carbide Corp.), 35 parts "Polycine 99F" (a castor oil polyol commercially available from Baher Castor Oil Co.), and 15 parts of "Piccolastic A-5" (a thermoplastic polystyrene resin commercially available from Pennsylvania Industrial Chemical Corp.).

For Examples 13-21 a sufficient amount of a solution of 20 parts bis(trifluoromethylsulfonyl)methane in 20 parts of diethylene glycol was added to Part B of each example to provide the catalyst concentration shown in Table IV (based on total weight of Part A plus Part B). For Examples 22-26 a sufficient amount of a solution of 20 parts boron trifluoride in 80 parts of glycerol was added to Part B of each example to provide the catalyst concentration shown in the table. Parts A and B were then mixed and the gel time shown in Table IV measured.

TABLE IV

| Ex. No. | Catalyst Concentration Wt. % | Gel Time Minutes |
|---|---|---|
| 13 | 0.60 $(CF_3SO_2)_2CH_2$ | 6.5 |
| 14 | 0.50 $(CF_3SO_2)_2CH_2$ | 7.9 |
| 15 | 0.45 $(CF_3SO_2)_2CH_2$ | 8.8 |
| 16 | 0.40 $(CF_3SO_2)_2CH_2$ | 12.1 |
| 17 | 0.35 $(CF_3SO_2)_2CH_2$ | 13.25 |
| 18 | 0.30 $(CF_3SO_2)_2CH_2$ | 14.0 |
| 19 | 0.25 $(CF_3SO_2)_2CH_2$ | 23.6 |
| 20 | 0.20 $(CF_3SO_2)_2CH_2$ | 45.0 |
| 21 | 0.15 $(CF_3SO_2)_2CH_2$ | 70.0 |
| 22 | 0.10 $BF_3$ | 1.8 |
| 23 | 0.08 $BF_3$ | 2.9 |
| 24 | 0.06 $BF_3$ | 5.0 |
| 25 | 0.05 $BF_3$ | 20.0 |
| 26 | 0.04 $BF_3$ | >90.0 |

Thus, the data shows that a four-fold change in concentration of the highly fluorinated aliphatic sulfonyl protonic acid catalyst produces less than an eleven-fold change in the gel time of the composition. However, a 2.5 fold change in concentration of boron trifluoride catalyst produces more than a 50 fold change in gel time of the composition.

EXAMPLES 27-40

To illustrate the effect of catalyst concentration on the rate of curing of compositions containing both (a) aromatic compounds having epoxide functionality, and (b) compounds having hydroxyl functionality, there were run a series of examples, each having a Part A and a Part B. Part A in each example comprised 80 grams of "Epon 828" (an aromatic epoxide); Part B comprised 20 grams of diethylene glycol.

For Examples 27-34 there was added to Part B the various amounts of bis(trifluoromethylsulfonyl)methane shown in Table V, and in Examples 35-40 there was added to Part B the various amounts of boron trifluoride shown in the table. The weight % of catalyst shown is based on the total weight of Part A and Part B. Parts A and B were then mixed and the gel time obtained for each composition is shown in Table V.

TABLE V

| Ex. No. | Catalyst Concentration Wt. % | Gel Time Minutes |
|---|---|---|
| 27 | 0.60 $(CF_3SO_2)_2CH_2$ | 4.3 |
| 28 | 0.50 $(CF_3SO_2)_2CH_2$ | 5.2 |
| 29 | 0.45 $(CF_3SO_2)_2CH_2$ | 5.7 |
| 30 | 0.40 $(CF_3SO_2)_2CH_2$ | 6.3 |
| 31 | 0.30 $(CF_3SO_2)_2CH_2$ | 8.5 |
| 32 | 0.25 $(CF_3SO_2)_2CH_2$ | 10.25 |
| 33 | 0.20 $(CF_3SO_2)_2CH_2$ | 12 |
| 34 | 0.15 $(CF_3SO_2)_2CH_2$ | 17.8 |
| 35 | 0.14 $BF_3$ | 5 |
| 36 | 0.10 $BF_3$ | 7 |
| 37 | 0.08 $BF_3$ | 9 |
| 38 | 0.06 $BF_3$ | 16 |
| 39 | 0.05 $BF_3$ | 18 |
| 40 | 0.04 $BF_3$ | 23 |

Upon standing for about ½ hour each of the compositions of Examples 27-34 were cured to a tack-free state while those of Examples 35-40 remained tacky.

The data of Table V shows that when the material having epoxy functionality is an aromatic compound, compositions having a gel time of 5 to 10 minutes are obtained when using 0.25 to 0.50 weight percent of a highly fluorinated aliphatic sulfonyl protonic acid catalyst. On the other hand, when using BF$_3$ as the catalyst the concentration thereof must be maintained about 0.08 and 0.14 weight percent in order to obtain a composition having a gel time of 5 to 10 minutes. Thus, the catalyst concentration in the foregoing compositions of the invention is less critical and requires less control than when using BF$_3$.

EXAMPLES 41-47

To illustrate the effect of catalyst concentration on the curing of compositions containing both (a) aliphatic compounds having epoxide functionality, and (b) compounds having hydroxyl functionality, a series of examples were run as in Examples 27-40 except that Part A comprised an aliphatic epoxy compound "ERL 4221" in place of "Epon 828." "ERL-4221" is 3,4-epoxycyclohexylmethyl-3,4-epoxycyclohexene carboxylate, commercially available from Union Carbide Corp. The concentrations of catalyst used and the gel times obtained for the various compositions are shown below in Table VI.

TABLE VI

| Ex. No. | Catalyst Concentration Wt. % | Gel Time Minutes |
|---|---|---|
| 41 | 0.05 (CF$_3$SO$_2$)$_2$CH$_2$ | <1 |
| 42 | 0.025 (CF$_3$SO$_2$)$_2$CH$_2$ | 2 |
| 43 | 0.017 (CF$_3$SO$_2$)$_2$CH$_2$ | 3 |
| 44 | 0.010 (CF$_3$SO$_2$)$_2$CH$_2$ | 8 |
| 45 | 0.008 (CF$_3$SO$_2$)$_2$CH$_2$ | 13 |
| 46 | 0.06 BF$_3$ | Localized gelling in <10 sec. but no cure |
| 47 | 0.04 BF$_3$ | Exotherm but no gelling or cure |

The data in Table VI show that compositions in which the epoxy-containing material is aliphatic require much less highly fluorinated aliphatic sulfonyl protonic acic catalyst for curing than is necessary for curing compositions in which the epoxy-containing material is aromatic. Example 47 shows that 0.04% BF$_3$ causes the composition to exotherm but does not gel or cure, and Example 46 shows that 0.06% BF$_3$ causes localized gelling but does not effect complete gelling or curing.

After standing for about ½ hour the product of each of Examples 41-45 were cured to a tack-free state while the compositions of Examples 46 and 47 were not gelled.

What is claimed is:

1. A manufacture comprising in separate containers:
  (A) a first organic material having epoxide functionality greater than 1; and
  (B) a second organic material having hydroxyl functionality of at least 1, wherein a catalyst of the formula:

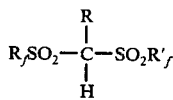

where R$_f$ and R$_f'$ are independently a highly fluorinated or perfluorinated alkyl and R is selected from H, Br, Cl, I, alkyl having 1 to 20 carbon atoms, alkenyl having 3 to 4 carbon atoms, aryl and alkaryl radicals, or a compound capable of liberating such catalyst is contained therein in an amount of at least 0.01% by weight; whereby polymerization occurs upon mixture of A and B in amounts sufficient to provide a ratio of equivalents of hydroxyl-containing material to equivalents of epoxide in the range of about 0.3/1 to 1.5/1.

2. A manufacture in accordance with claim 1, wherein said first organic material has an epoxide functionality of at least 2.

3. A manufacture in accordance with claim 1, wherein said first organic material comprises a mixture of epoxides in which up to 25% of the total epoxide equivalents is provided by organic material having epoxide functionality of 1, and the balance of the epoxide equivalents is provided by organic material having epoxide functionality of at least 2.

4. A manufacture in accordance with claim 1, wherein said second organic material has hydroxyl functionality of at least 2.

5. A manufacture in accordance with claim 1, wherein said second organic material comprises a mixture of hydroxyl-containing materials in which up to 25% of the total hydroxyl equivalents is provided by organic material having hydroxyl functionality of 1, and the balance of the hydroxyl equivalents is provided by organic material having hydroxyl functionality of at least 2.

6. A manufacture in accordance with claim 1, wherein said first organic material is selected from aromatic glycidyl ethers, aliphatic glycidyl ethers, cycloaliphatic glycidyl ethers and cycloaliphatic epoxides.

7. A manufacture in accordance with claim 1, wherein said second organic material is selected from alkylene polyols, polyoxyalkylene polyols, cycloalkylene polyols, and polyester polyols.

8. A manufacture in accordance with claim 1, wherein said first organic material comprises an aromatic glycidyl ether.

9. A manufacture in accordance with claim 1, wherein said first organic material comprises the glycidyl ether of Bisphenol A.

10. A manufacture in accordance with claim 1, wherein said first organic material comprises vinylcyclohexenedioxide.

11. A manufacture in accordance with claim 1, wherein said first organic material comprises 3,4-epoxycyclohexylmethyl-3,4-epoxycyclohexane carboxylate.

12. A manufacture in accordance with claim 1, wherein said second organic material comprises polyoxyalkylene polyol.

13. A manufacture in accordance with claim 1, wherein R is selected from hydrogen, bromine, or chlorine.

14. A composition in accordance with claim 1, wherein R is hydrogen.

15. A process for polymerizing a mixture of (a) a first organic material having epoxide functionality greater than 1, and (b) a second organic material having hydroxyl functionality of at least 1, the process comprising admixing with said first and second organic materials an effective amount of a catalyst of the formula:

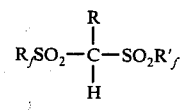

where $R_f$ and $R_f'$ are independently a highly fluorinated or perfluorinated alkyl and R is selected from H, Br, Cl, I, alkyl having 1 to 20 carbon atoms, alkenyl having 3 to 4 carbon atoms, aryl and alkaryl radicals, or a compound capable of liberating such catalyst.

16. A process in accordance with claim 15, wherein said first organic material has an epoxide functionality of at least 2.

17. A process in accordance with claim 16, wherein said second organic material has hydroxyl functionality of at least 2.

18. A process in accordance with claim 15, wherein said first organic material is selected from aromatic glycidyl ethers, aliphatic glycidyl ethers, cycloaliphatic glycidyl ethers and cycloaliphatic epoxides.

19. A process in accordance with claim 15, wherein said second organic material is selected from alkylene polyols, polyoxyalkylene polyols, cycloalkylene polyols, and polyester polyols.

20. A process in accordance with claim 15, wherein said first organic material comprises an aromatic glycidyl ether.

21. A process in accordance with claim 15, wherein said second organic material comprises polyoxyalkylene polyol.

22. A process in accordance with claim 15, wherein R is selected from hydrogen, bromine, or chlorine.

23. A process in accordance with claim 15, wherein R is hydrogen.

24. A polymerizable composition comprising:
(a) a first organic material having epoxide functionality greater than 1;
(b) a second organic material having hydroxyl functionality of at least 1; and
(c) a catalyst of the formula:

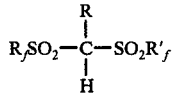

where $R_f$ and $R_f'$ are independently a highly fluorinated or perfluorinated alkyl and R is selected from H, Br, Cl, I, alkyl having 1 to 20 carbon atoms, alkenyl having 3 to 4 carbon atoms, aryl and alkaryl radicals or a compound capable of liberating such catalyst, said catalyst being present in an amount sufficient to effect polymerization of said organic materials upon admixture.

* * * * *